June 13, 1967 M. W. FORD 3,325,701

SEMICONDUCTOR DEVICE

Filed April 2, 1964

INVENTOR.
MARTIN W. FORD
BY

ATTORNEY 3,325,701
SEMICONDUCTOR DEVICE

Martin W. Ford, North Palm Beach, Fla., assignor, by mesne assignments, to Solitron Devices, Inc., a corporation of New York Filed Apr. 2, 1964, Ser. No. 356,729
9 Claims. (Cl. 317—234)

Figure 1:
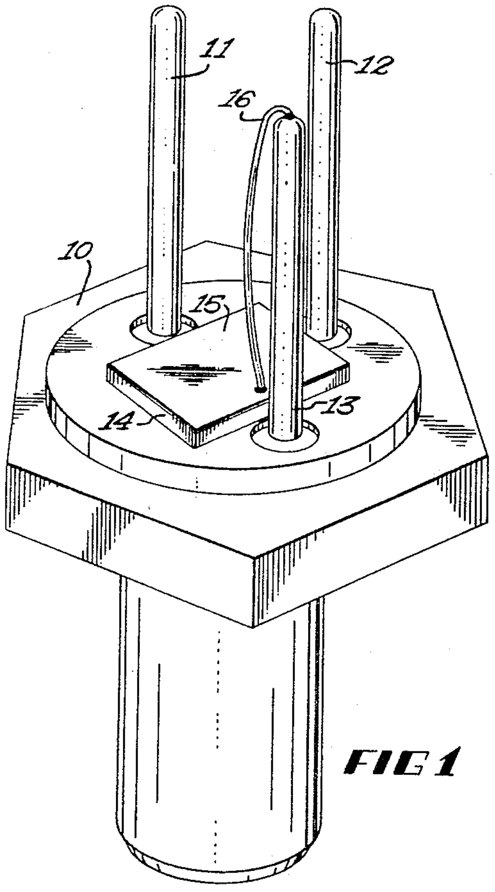
FIG 1 PRIOR ART

This invention relates generally to improvements in semiconductor devices. More particularly, it relates to a novel construction for such devices which permits rapid removal of self-generated heat therefrom in conjunction with a novel way of electrically contacting the semiconductor elements and a novel method of assembling such devices.

In the prior art, it has been customary to provide a layer of electrical insulating material having a relatively high thermal conductivity, such as beryllium oxide, between the semiconductor elements of the device and a metallic heat conductor or header which is adapted to be secured to a heat radiator, such as a metallic chassis. Such an arrangement allows for the conduction of heat from the semiconductor device to the heat radiator while maintaining the semiconductor element in electrically isolated relationship to the heat radiator. Electrical contact has been made in such prior art devices to the semiconductor element by means of a metallized layer or coating placed on the upper surface of the electrical insulating material. The semiconductor element is then placed in contact with this conductive layer. An electrical pin or post on the header and adjacent to the insulating body is then connected to the metallic coating by means of an electrical lead soldered to the coating and to an upper portion of the post. In the case of transistors, the collector thereof is placed in contact with the metallized surface on the insulating material and electrical contact thereto is achieved as previously described. This has been termed the "electrically isolated collector" type of assembly.

This type of construction has been satisfactory to a degree except for the fact that it requires an electrical lead to be bonded to the conductive coating on the insulating material and to the collector post. This lead, which is usually a high current carrying lead, has been found to be a source of many electrical contact problems.

Accordingly, it is an object of this invention to provide a new and improved configuration for mounting semiconductor elements thus eliminating the need for an electrical lead between the upper surface of the insulating body and the post.

It is a further object of this invention to provide a new and improved electrically isolated collector construction for transistors.

Still another object of this invention is to provide a new and improved method of assembling semiconductor devices which is simpler than the methods of the prior art and which requires fewer fabrication steps.

All semiconductor elements require at least two regions on the body proper to be electrically contacted.

In the case of a transistor, there are usually three regions which must be electrically contacted, the base, emitter and collector regions. The present invention is clearly applicable to all types of semiconductor elements, but for the sake of clarity and simplicity will be discussed with reference to transistors.

In carrying out the present invention in one illustrative embodiment thereof, use is made of a beveled edge on the electrical insulating material or pedestal upon which the transistor is mounted. This edge allows direct contact to the pedestal by a post mounted on the header thus eliminating the requirement for a lead extending between the pedestal and the post.

These and other advantages of this invention will be more clearly understood by the following description taken in connection with the accompanying drawings in which, FIGURE 1 is a perspective view of the header assembly for a semiconductive device of the electrically isolated type in accordance with the prior art.

Figure 2:
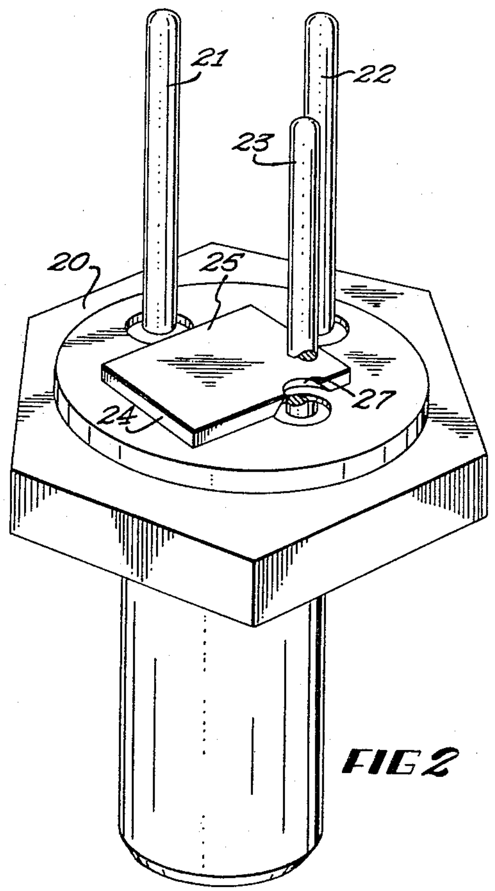

FIGURE 2 is a perspective view of a preferred embodiment of the present invention with a portion thereof broken away.

FIGURES 3, 4, 5, and 6 are schematic representations of alternate embodiments of the present invention.

Since the present invention has particular utility in connection with transistors of the electrically isolated collector type, the illustrative embodiments selected describe the invention relative to such assemblies. However, the invention is not limited specifically to transistors but includes broadly all semiconductor devices which require mounting on an insulating body in an electrically isolated condition with respect to the header assembly.

Referring now to FIGURE 1, the prior art assembly utilized in mounting a transistor of the electrically isolated collector type is shown. A heat conductive header generally designated as 10 is provided with three posts designated the emitter post 11, base post 12 and collector post 13 respectively. These posts are shown mounted on header 10 and insulated therefrom by means of glass seals as is well known in the art. These posts in conjunction with the appropriate leads serve as electrical connections to the transistor proper (not shown), which is subsequently included in the assembly. Mounted on header 10 and in good head conductive relationship therewith is a body of insulating materal 14 more commonly termed a pedestal. Pedestal 14 is affixed to header 10 by means of soldering or the like which is well known in the art. The upper surface of pedestal 14 is provided with an electrically conductive coating 15 such as solder or the like. The actual transistor proper (not shown) is mounted on the surface of pedestal 14 with the collector thereof in electrical contact with metallic coating 15 by practices well known in the prior art. Electrical contact is then made to the collector of the transistor by means of electrical lead 16 extending between coating 15 and collector post 13. Additional leads (not shown) extending from posts 11 and 12 are also subsequently provided to contact suitable portions of the transistor, that is, the base and emitter leads. Subsequently, the whole upper portion of header 10 is encased to protect the working elements of the device.

As stated previously, this type of construction for providing a transistor assembly of the electrically isolated collector type has been satisfactory to a degree. However, electrical lead 16 has proven to be a source of contact problems due to the relatively high currents carried thereby. The prior art design also requires the lead to be bonded at coating 15 and at post 13. A major advantage of the present invention resides in the elimination of this electrical lead.

Referring to FIGURE 2, a preferred embodiment of the present invention is shown. A heat conductive header generally designated as 20 is shown with three conductive posts—the emitter post 21, base post 22, and collector post 23 respectively. These posts, as in the prior art structure, are insulated from header 20 by the glass to metal seals and serve to make electrical connection to the transistor regions proper (not shown). Also mounted on header 20 and in good heat conductive relationship therewith is pedestal 24. As in the prior art devices, the pedestal may be of many ceramic materials such as beryllium oxide, aluminum oxide or magnesium oxide. Pedestal 24 may be affixed to header 20 according to well known prior art techniques as discussed hereinabove. The upper surface of the pedestal is provided with an electrically conductive coating 25 such as solder or the like. The transistor proper (not shown) is then mounted directly on pedestal 24 with a desired region such as the collector, contacting coating 25.

Due to the novel design of pedestal 24 the need for an electrical lead extending from coating 25 to the collector post 23 is eliminated. As shown, pedestal 24 is provided with a peripheral notch 27. Notch 27 is shown as being smaller at the upper surface of pedestal 24 than at the lower surface thereof to provide a beveled edge thereon. The purpose of this beveled edge will become apparent in later discussion. As shown, pedestal 24 is placed on header 20 in such a position as to have collector post 23 adjacent notch 27 with a side portion of post 23 contacting or in near contact to the notch at the upper surface of pedestal 25 thus providing immediate electrical contact to the transistor which is subsequently mounted on pedestal 24 or requiring merely a small bead of solder to complete contact. In any event, the need for a lead wire is eliminated.

Another configuration achieving the advantages of this invention is the arrangement in which a beveled aperture is provided in a central portion of the pedestal rather than utilizing a notch or aperture at an edge thereof. When mounting the pedestal on the header, the post is inserted through the aperture thus achieving contact with the upper surface of the pedestal.

Figure 3:
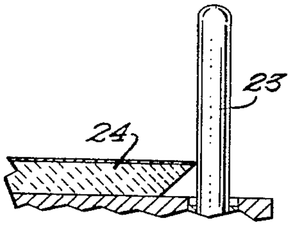
Figure 4:
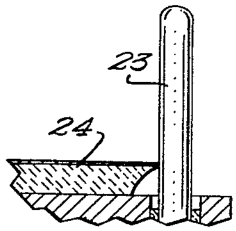
Figure 5:
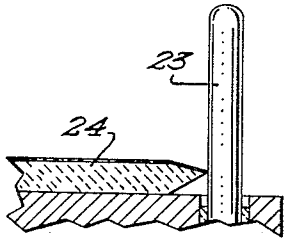
Figure 6:
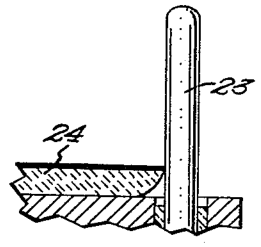

Other novel configurations which obtain the same advantages as the preferred embodiment of FIGURE 2 are shown in FIGURES 3 through 6 in a schematic fashion. As shown in FIGURE 3, one entire end portion of pedestal 24 may be beveled to provide the desirable contact with post 23. The bevel may be straight as shown in FIGURE 3 or curved as shown in FIGURES 4 or 6. FIGURE 6 has the advantage of possessing more strength, an important consideration if brittle ceramics are used for pedestal 24. FIGURE 5 shows another configuration which may be used to achieve some of the advantages of the invention.

In addition, the novel configurations of pedestal 24 lend themselves to a new and novel process for assembling the semiconductive devices. This process is much simpler than those used in the prior art and more convenient.

Pedestal 24 is first shaped to the desired configuration and provided with upper and lower metallic coatings. It is then positioned as shown in FIGURE 2 with notch 27 or its equivalent adjacent post 23 and brazed or soldered to header 20. The brazing material rapidly wets the coating on the lower surface of pedestal 24. Simultaneously, the upper coating is brazed to post 23. Electrical shorting between the upper and lower surfaces of pedestal 24 due to flowing of the upper coating at the temperature involved is prevented by the beveled edge thereon since it overlays the glass insulation surrounding post 23. The beveled edge prevents the brazing material from running down the post and shorting the upper and lower metallized layers. Thus, when the transistor is subsequently mounted on the upper surface of pedestal 24, collector contact is established directly to it.

I claim:

1. An electrically isolated collector assembly for transistors comprising:

a heat conductive base member, a body of beryllium oxide material mounted on said base member in good heat conductive relationship therewith, said body of beryllium oxide having opposing upper and lower surfaces and a peripheral indentation at one edge portion thereof, said indentation being smaller at said upper surface than at said lower surface, a metal coating on said upper surface of said body of beryllium oxide, a conductive post member extending upwardly from said base member and insulated therefrom, said post being positioned immediately adjacent said indentation and said metal coating on said upper surface of said body of beryllium oxide, and a transistor mounted on said upper surface of said body of beryllium oxide with the collector thereof in electrical contact with said metal coating.

2. An electrically isolated collector assembly for transistors comprising:

a heat conductive base member, a body of aluminum oxide material mounted on said base member in good heat conductive relationship therewith, said body of aluminum oxide having opposing upper and lower surfaces and a peripheral indentation at one edge portion thereof, said indentation being smaller at said upper surface than at said lower surface, a metal coating on said upper surface of said body of aluminum oxide.

a conductive post member extending upwardly from said base member and insulated therefrom, said post being positioned immediately adjacent said indentation and said metal coating on said upper surface of said body of aluminum oxide, and a transistor mounted on said upper surface of said body of aluminum oxide with the collector thereof in electrical contact with said metal coating.

3. An electrically isolated semiconductive device assembly comprising:

a heat conductive base member, a ceramic body mounted on said base member, said ceramic body having upper and lower surface portions, and a peripheral indentation extending therebetween, said indentation being smaller at said upper surface portion than at said lower surface portion, a conductive coating on said upper surface portion of said ceramic body, a conductive post member mounted on said base member and insulated therefrom, said post extending upwardly from said base and being positioned immediately adjacent said indentation and said upper surface, and a semiconductor body mounted on said ceramic body and electrically contacting said conductive coating.

4. A semiconductive device comprising:

a heat conductive base member, a ceramic body defining upper and lower surfaces mounted on said base member so as to position said lower surface in good heat conductive relationship with said base member, said ceramic body having an aperture extending from said upper to said lower surface with the opening thereof being smaller at said upper surface than at said lower surface, a conductive coating on said upper surface of said ceramic body, a conductive post member mounted on said base member and insulated therefrom, said post being positioned immediately adjacent said aperture in said ceramic body and at least an edge of said conductive coating on said upper surface thereof, and a semiconductor body electrically contacting said conductive coating on said ceramic body.

5. A semiconductive device assembly comprising:

a heat conductive base member, a body of beryllium oxide material with an upper conductive surface and an opposing lower surface, said body of beryllium oxide having at least a portion of an edge extending beyond an end of said lower surface, means for bonding at least a portion of said lower surface of said body of beryllium oxide to said base member, a conductive post member mounted in said base member and insulated therefrom, said post being positioned immediately adjacent said extending edge of said body of beryllium oxide at said upper conductive surface, and
a semiconductive body mounted on said upper conductive surface of said body of beryllium oxide and in electrical contact therewith.

6. A semiconductive device assembly comprising:
a heat conductive base member,
a body of aluminum oxide material with an upper conductive surface and an opposing lower surface, said body of aluminum oxide having at least a portion of an edge extending beyond an end of said lower surface,
means for bonding at least a portion of said lower surface of said body of aluminum oxide to said base member,
a conductive post member mounted in said base member and insulated therefrom, said post being positioned immediately adjacent said extending edge of said body of aluminum oxide at said upper conductive surface, and
a semiconductor body mounted on said upper conductive surface of said body of aluminum oxide and in electrical contact therewith.

7. A semiconductive device assembly comprising:
an electrically insulating heat conductive member having upper and lower metallized surfaces, said insulating member having at least a portion of an end surface thereof extending upwardly and outwardly with respect to said lower surface,
a heat conductive base member bonded to said lower surface of said insulating member,
a conductive post member extending upwardly from said base member and insulated therefrom, said post being positioned immediately adjacent said portion of said end surface of said insulating member, and
a semiconductor body mounted on said upper conductive surface and in electrical contact therewith.

8. A semiconductive device assembly comprising:
a heat conductive base member,
an electrically insulating heat conductive member with an upper conductive surface and an opposing lower surface, said insulating member having at least a portion of an edge extending beyond an end of said lower surface,
means for bonding said lower surface of said insulating member to said base member,
a conductive post member mounted in said base member and insulated therefrom, said post being positioned immediately adjacent said extending edge of said insulated member and said upper conductive surface, and
a semiconductor body mounted on said upper conductive surface of said insulating member and in electrical contact therewith.

9. A semiconductive device assembly comprising:
a heat conductive base member,
an electrically insulating heat conductive member having an upper conductive surface and an opposing lower surface; said upper surface extending beyond said lower surface,
means for bonding said lower surface of said insulating member to said base member,
a conductive post member mounted on said base member and insulated therefrom, said post being positioned adjacent said insulating member and extending upwardly from said base with a portion of said post contacting said upper conductive surface of said insulating member, and
a semiconductor body mounted on said upper conductive surface of said insulating member and in electrical contact therewith.

References Cited

UNITED STATES PATENTS

| | | | |
|---|---|---|---|
| 2,948,835 | 8/1960 | Runyan | 317—234 |
| 3,020,454 | 2/1962 | Dixon | 317—235 X |
| 3,176,382 | 4/1965 | Dickson | 29—155.5 |
| 3,186,065 | 6/1965 | Hunt | 29—155.5 |
| 3,210,618 | 10/1965 | Rosenberg | 317—234 |

JOHN W. HUCKERT, *Primary Examiner.*

A. M. LESNIAK, D. O. KRAFT, *Assistant Examiners.*